Aug. 7, 1956
F. L. FOX
2,758,232
VACUUM DISCHARGE GAUGE
Filed Aug. 17, 1951
2 Sheets-Sheet 1
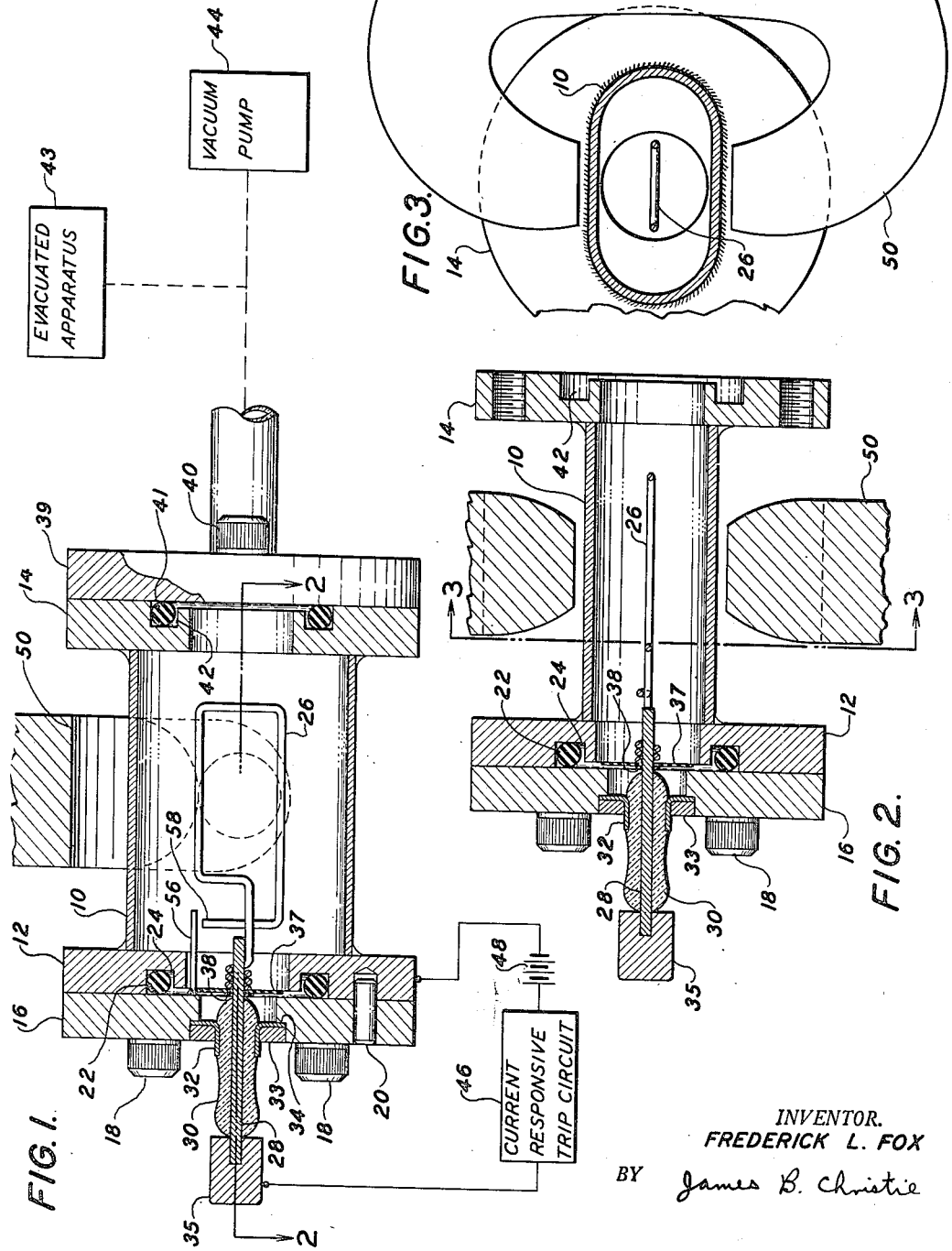
INVENTOR.
FREDERICK L. FOX
BY James B. Christie
ATTORNEY Aug. 7, 1956     F. L. FOX     2,758,232
VACUUM DISCHARGE GAUGE
Filed Aug. 17, 1951     2 Sheets-Sheet 2
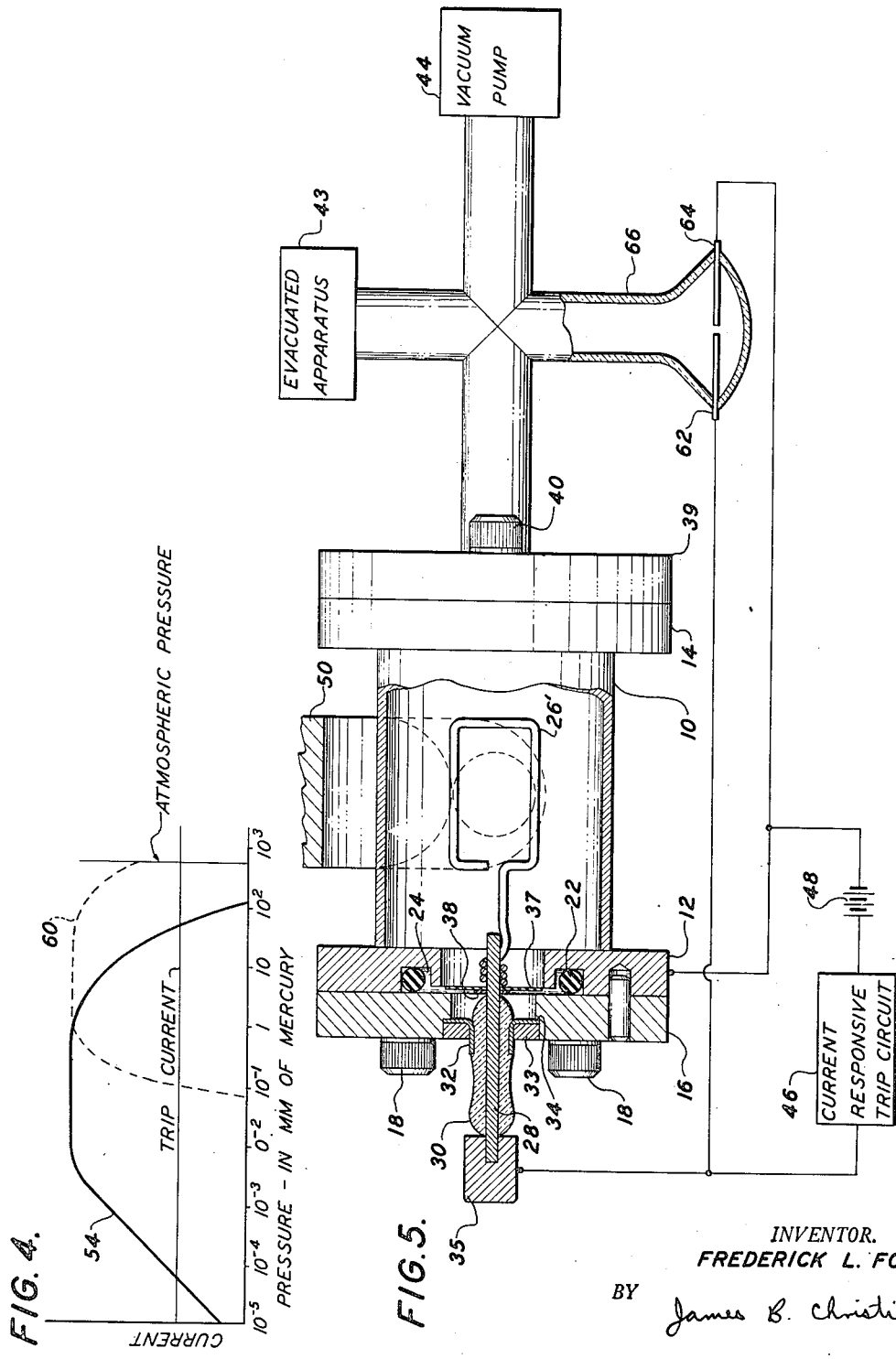
INVENTOR.
FREDERICK L. FOX
BY James B. Christie
ATTORNEY

United States Patent Office 2,758,232
Patented Aug. 7, 1956

2,758,232

VACUUM DISCHARGE GAUGE

Frederick L. Fox, Pasadena, Calif., assignor, by mesne assignments, to Consolidated Electrodynamics Corporation, Pasadena, Calif., a corporation of California Application August 17, 1951, Serial No. 242,259

4 Claims. (Cl. 313—7)

This invention relates to vacuum discharge gauges, and provides improved vacuum discharge gauges capable of operating over a wide range of pressures.

It has been proposed previously to construct a vacuum discharge gauge having an anode electrode located adjacent to a pair of cathode electrodes, the anode and cathode electrodes being located within a glass enclosure which is coupled to a system containing a gas which is to be evacuated. A magnetic field is provided between the cathode electrodes so as to cause the electrons to travel back and forth between the cathode electrodes before they are collected by the anode. When a high voltage is applied between the anode and the cathode electrodes of such a vacuum discharge gauge, the current which flows between the anode and the cathode electrodes varies with variations in the gas pressure within the chamber.

In order to provide a substantially linear response at low pressures, such a vacuum discharge gauge employs a large spacing between the anode and the two cathode electrodes. With such an arrangement, the current increases substantially linearly to its maximum value as the gas pressure within the chamber is increased from a predetermined minimum value, and then the current remains substantially constant until the gas pressure increases to a pressure which is less than atmospheric, whereupon the current decreases rapidly and is substantially zero at a pressure which is appreciably less than atmospheric.

If such a vacuum discharge gauge were employed in an evacuated system in conjunction with a current-operated protection device for providing an alarm or a control means when the gas pressure in the evacuated system rises above a predetermined value, protection would be lost when the gas pressure in the evacuated system approached atmospheric pressure, because the current which flows through the vacuum discharge gauge is too small to operate the protection device. Moreover, were such a vacuum discharge gauge employed to measure gas pressure, an operator would have difficulty in determining whether the gauge was functioning within its substantially linear range, which occurs at low pressures, or within the pressure range near atmospheric pressure, for the electric current flowing through the gauge would be less than its maximum value for both of these pressure ranges.

In the apparatus of the present invention, a conductive housing is employed both to provide a fluid-tight chamber for enclosing an anode electrode and to provide a cathode electrode, and the operating range of the gauge is extended to atmospheric pressure by providing an auxiliary discharge gap which is connected between the anode electrode and the conductive housing. The spacing of the auxiliary gap is shorter than the spacing between the main anode and cathode electrodes, and it provides a smaller electron discharge space than that provided by the main anode and cathode electrodes.

The invention will be more fully understood from the following description and the drawings, wherein:

Fig. 1 is a sectional view of a preferred form of the apparatus of the invention;

Fig. 2 is a sectional view along line 2—2 in Fig. 1;

Fig. 3 is a sectional view along ilne 3—3 in Fig. 2;

Fig. 4 is a curve which illustrates the operation of the invention; and

Fig. 5 shows one modification of the apparatus shown in Fig. 1.

Referring to Figs. 1–3, a hollow conductive member 10 serves to provide a chamber for enclosing the electron discharge apparatus. The conductive member 10 should be composed of a non-magnetic material, for example stainless steel. A pair of flanges 12, 14 are connected to the ends of the hollow member so as to provide a convenient means for attaching other apparatus to the member. An end plate 16 is connected to the flange 12 by means of a pair of screws 18 and a guide pin 20. An annular ring 22, which is composed of a resilient material such as neoprene, is located in an annular groove 24 in the flange 12, and the ring serves to provide a vacuum seal between this flange 12 and the neighboring end plate.

A wire 26 in the form of an elongated loop, is supported by a conductor 28 so that the loop is centrally located within the chamber defined by the conductive member 10. A glass seal 30 serves to support the conductor 28, and the glass seal 30 is connected to the end plate 16 by means of a metallic member 32 and solder 33 which serve to provide a vacuum-tight seal between a shoulder 34 in the end plate 16 and the glass seal 30. A terminal 35 is connected to the conductor 28 so as to provide means for connecting a source of potential thereto.

A pair of mica washers 37 and 38 are located on the conductor 28 between the glass seal 30 and the junction between the conductor 28 and the wire 26. The washer 37 serves to close the circular aperture in the end plate 16 so as to prevent the waste products which are produced as a result of the electric discharges within the member 10 from being deposited on the glass seal 30. Thus, the electrical insulation provided by the glass seal 30 is maintained substantially unimpaired even after extensive use of the discharge gauge.

An end plate 39 which is connected to the flange 14 by means of a pair of screws 40 is employed to couple the chamber defined by the member 10 to a system which is to be evacuated. A second annular ring 41, which is composed of a resilient material such as neoprene, is located in an annular groove 42 in the flange 14, and the ring 41 serves to provide a vacuum seal between the flange 14 and the end plate 39.

The system which is coupled to the chamber defined by the member 10 by means of the end plate 39, is illustrated schematically in the drawings by the evacuated apparatus 43 and the vacuum pump 44.

A magnet 50 which is shaped like the letter C is located adjacent to the member 10 so that a magnetic field is provided in the chamber between the two parallel walls of the member 10, as shown in Fig. 3. The magnet 50 may be a permanent magnet or an electromagnet. The magnet 50 is disposed so that the magnetic flux lines are at right angles to the two parallel walls of the member 10 and to the plane of the loop formed by the wire 26, and the pole pieces of the magnet 50 are of approximately the same diameter as the transverse dimension of the loop defined by the wire 26.

In order to employ the apparatus disclosed in Figs. 1–3 as a protective or alarm device so as to provide a control action or a signal when the gas pressure within the system rises above a certain value, a current-responsive trip circuit 46 and a high voltage source of potential 48 are connected in series between the conductive member 10 and the wire 26.

The member 10 serves as a cathode which emits electrons, and the wire 26 serves as an anode which attracts the electrons. The wire 26 is located so that the shortest distance between the wire and the member 10 is along a line perpendicular to the parallel walls of the member 10. Thus, the electric field is substantially at right angles to the parallel walls of the member 10. The high potential which is applied between the cathode member 10 and the anode wire 26 causes an electron discharge current to flow in the space between the member 10 and the wire 26, and the magnetic field produced by the magnet 50 serves to cause the electrons which have a high velocity to travel in the direction of the magnetic flux lines.

Thus, the electrons which are emitted from the cathode member 10 are caused to travel along paths which are substantially at right angles to the two parallel walls of the member 10. Since the electrons are attracted by the wire 26 and are repelled by the member 10, they are caused to move back and forth substantially at right angles to the two parallel walls of the member 10 until they are decelerated sufficiently to be collected by the wire 26.

The current which flows in the electron discharge path between the member 10 and the wire 26 varies with the gas pressure within the member 10 in accordance with the solid line curve 54 shown in Fig. 4. As the pressure within the chamber defined by the member 10 is increased from a minimum value, the current which flows through the vacuum discharge gauge and the current-responsive trip circuit 46 increases substantially linearly to its maximum value, and then the current remains substantially constant until the gas pressure increases to about one millimeter of mercury, whereupon the current decreases rapidly and is substantially zero at about 100 millimeters of mercury.

The current-responsive trip circuit 46 is actuated when the current which flows between the member 10 and the wire 26 increases to a predetermined value such as the current which flows when the pressure increases to slightly more than $10^{-4}$ millimeters of mercury. As the gas pressure increases further, the current-responsive trip circuit 46 is maintained in an actuated condition until the gas pressure within the chamber 10 approaches 100 millimeters of mercury, whereupon the current between the member 10 and the wire 26 decreases rapidly and is less than the trip current for the circuit 46. Thus, when the gas pressure in the system approaches or is larger than 100 millimeters of mercury, the current which flows between the member 10 and the wire 26 is too small to actuate the current-responsive trip circuit 46.

In order to provide a current through the vacuum discharge gauge which is large enough to actuate the current-responsive trip circuit 46 over the pressure range from about one millimeter to 760 millimeters of mercury (i. e., to atmospheric pressure), an auxiliary gap is provided between a wire 56, which is soldered or welded to the end plate 16, and an end 58 of the wire 26.

The auxiliary gap defined by the wire terminals 56 and 58 provides a second electron discharge path which serves to provide a glow discharge or an arc in the pressure range between about one-tenth millimeter and 760 millimeters of mercury. The spacing between the wire 56 and the end 58 of the wire 26 is much less than the spacing between the wire 26 and the member 10, and the wire 56 and the end 58 of the wire 26 serve to provide an electron discharge path through a much smaller space than that provided by the member 10 and the wire 26. In one embodiment of the invention the wire 56 and the end 58 of the wire 26 were spaced .030 inch and the source 48 provided a potential of 3000 volts. The current which flowed through the auxiliary gap defined by the wire 56 and the end 58 of the wire 26 varied with the gas pressure in accordance with the dashed line curve 60 shown in Fig. 4.

The current which flows through the auxiliary gap is determined by the length of the gap and by the voltage which is applied across the gap, as well as by the gas pressure within the member 10. It will be apparent that the response of the auxiliary gap need not be limited to that shown in Fig. 4.

Since the electron discharge path provided by the member 10 and the wire 26, and the auxiliary electron discharge path provided by the wire 56 and the end 58 of the wire 26 are connected in shunt, the current which flows through the vacuum discharge gauge varies substantially in accordance with the curve 54 as extended by the curve 60 shown in Fig. 4. Accordingly, the vacuum discharge gauge shown in Figs. 1–3 serves to provide adequate current for actuating the current-responsive trip circuit 46 throughout the pressure range from about $10^{-4}$ millimeters of mercury to atmospheric pressure.

The auxiliary gap arrangement disclosed herein is particularly useful if a sudden large break occurs in the evacuated system and causes a rise in the gas pressure which is too fast to permit the control action provided by the main electron discharge path between the member 10 and the wire 26 to cause the current-responsive trip circuit 46 to operate. The apparatus shown in Figs. 1–3 serves to provide sufficient current to operate the current-responsive trip circuit 46 even at atmospheric pressure.

When the apparatus shown in Figs. 1–3 is employed as a vacuum gauge to measure low gas pressures, there is very little likelihood of ambiguity in the measurements since the electric current which flows through the gauge is large throughout the range from atmospheric pressure to the linear response range of the gauge.

It will be observed that the apparatus is arranged so that when the screws 18 are removed, the entire apparatus which is connected to the end plate 16 may be withdrawn from the chamber 10 for inspection or for cleaning if necessary.

Preferably, all of the metallic members of the apparatus shown in Figs. 1–3 should be non-magnetic. The conductor 28 and the metallic seal 32 should be composed of one of the well-known metals, such as Kovar, which can be sealed to glass, and the other metallic members may be composed of type 18–8 stainless steel, for example.

Fig. 5 shows a modification of the apparatus shown in Figs. 1–3, wherein an auxiliary gap, which is located in the system to be evacuated, is provided by means of a pair of terminals which are separate from the main vacuum discharge gauge. In this modification of the invention, the wire 26' is shaped in the form of a substantially closed loop, but the end of the wire 26' is not employed to provide an auxiliary gap, as is the case in the embodiments shown in Figs. 1–3. The auxiliary gap is provided by means of a pair of terminals 62 and 64 which are mounted in a glass container 66, which in turn is connected to the system to be evacuated. The terminal 62 is connected to the wire 26', and the terminal 64 is connected to the conductive member 10, so that the auxiliary gap defined by the electrodes 62 and 64 is connected in shunt with the main electron discharge path provided by the wire 26' and the member 10.

The apparatus shown in Fig. 5 functions in the same manner as the apparatus shown in Figs. 1–3, and differs from that shown in Figs. 1–3 only in that the electrodes which define the auxiliary gap are not located within the member 10.

An important feature of the invention is the provision of a pair of electron discharge paths within the system to be evacuated wherein one of the electron discharge paths provides a smaller electron travel distance than that of the other path. It will be apparent that there are various ways of providing such an arrangement, and that various modifications may be made in the apparatus disclosed herein without departing from the scope of the invention. The auxiliary gap arrangement disclosed herein is not limited to use with the specific cathode 10 and anode 26 arrangement shown in the drawings, but it may be employed in conjunction with any vacuum discharge gauge which provides an electron discharge path which is longer than the electron discharge path provided by the auxiliary gap.

I claim:

1. In a vacuum discharge gauge, the combination comprising a conductive member enclosing a portion of the space to be evacuated, a conductive electrode in the form of a loop extending within and electrically insulated and spaced from the conductive member to provide a first electron discharge path in the space for measuring a predetermined range of pressures, means for providing a magnetic field in the space enclosed by the conductive member wherein the magnetic lines of flux are substantially normal to the plane of the loop, and a pair of spaced terminals comprising an end portion of the loop electrode and a further conductor rigidly connected to the conductive member, said spaced terminals defining a gap located within the space to be evacuated and providing a second electron discharge path which is less than one-half the length of the first electron discharge path and which is adapted to pass current over a range of pressures higher than said predetermined range.

2. The apparatus of claim 1 wherein the conductive member is coupled to a system to be evacuated and wherein the spaced terminals comprise a pair of electrodes located within the system to be evacuated but outside the conductive member.

3. A vacuum gauge comprising a first conductive member defining a space to be evacuated, a second conductive member in the form of the loop extending within and electrically insulated and spaced from the first conductive member, the portion of the second conductive member which extends within the first conductive member being spaced substantially equidistant from a pair of opposed surfaces of the first conductive member, providing a first electron path within the space to be evacuated for passing an increasing amount of current with increasing pressure over a predetermined range of pressures, and means affixed to one of the conductive members having an end portion which is separated from the other conductive member by a space which is less than one-half the distance between the opposed surfaces of the first conductive member, providing a second shorter electron path connected in shunt with the first electron path for passing current over a range of pressures greater than said predetermined range.

4. In a vacuum discharge gauge, the combination comprising a conductive member enclosing a portion of the space to be evacuated, a conductive electrode in the form of a loop extending within and electrically insulated from the conductive member to provide a first electron discharge path in the space for passing an increasing amount of current with increasing pressure over a predetermined range of pressures, means for providing a magnetic field in the space enclosed by the conductive member with the magnetic lines of flux disposed approximately normal to the plane of the loop, and means for providing a second electron discharge path located within the space to be evacuated with the second electron discharge path being connected in shunt with and having a shorter electron travel distance than the first electron discharge path for passing current over a range of pressures greater than said predetermined range, so that the conductive member and the conductive electrode may be energized as terminals to simultaneously energize both said first and said second electron discharge paths.

References Cited in the file of this patent

UNITED STATES PATENTS

| | | |
|---|---|---|
| 1,488,613 | Pickard | Apr. 1, 1924 |
| 2,490,468 | Picard | Dec. 6, 1949 |
| 2,497,213 | Downing | Feb. 14, 1950 |
| 2,497,823 | Molloy | Feb. 14, 1950 |
| 2,501,702 | Varian | Mar. 28, 1950 |
| 2,506,431 | Perret et al. | May 2, 1950 |
| 2,582,647 | Morgan | Jan. 15, 1952 |
| 2,625,586 | Lander | Jan. 13, 1953 |
| 2,648,818 | Cohen | Aug. 11, 1953 |

FOREIGN PATENTS

| | | |
|---|---|---|
| 630,885 | Great Britain | Oct. 24, 1949 |